March 24, 1953     M. F. SELWYN     2,632,462
FLUID RETURN VALVE
Filed Sept. 27, 1948

MARLOWE F. SELWYN,
INVENTOR.

HUEBNER, BEEHLER, WORREL,
HERZIG and CALDWELL.
ATTORNEYS.

Patented Mar. 24, 1953

2,632,462

UNITED STATES PATENT OFFICE 2,632,462

FLUID RETURN VALVE

Marlowe F. Selwyn, Los Angeles, Calif., assignor to Selwyn-Landers Company, Los Angeles, Calif., a copartnership Application September 27, 1948, Serial No. 51,376

6 Claims. (Cl. 137—322)

1

The application refers to valves and more especially check valves operating upon a differential in pressure and is especially well adapted to use as a vapor return valve in conjunction with the filling of liquid petroleum service tanks.

More or less recently there have been developed gas systems commonly identified as liquid petroleum gas systems which have certain exceptional characteristics to which new equipment has had to be adapted. Liquid petroleum systems comprise essentially a storage or service tank in which is stored liquid petroleum of such a character that it is very prone to volatilize and to maintain a considerable pressure in the volatilized gas. A petroleum product thus in a gaseous state is piped through customary piping in order to service gas-fired appliances such as stoves, heaters, and the like.

Because of the fact that the liquid petroleum hydrocarbon is such that it gives off a gas under appreciable pressure, the problem of filling or replenishing the service tank or reservoir becomes one different from merely filling a tank with a liquid substance. Where the lower portion of a tank contains liquid and the upper portion contains air or gas even under ordinary circumstances liquid will not flow readily into the tank because air or gas at the same time must escape. Moreover, where the gas is under pressure the filler inlet cannot be opened without gas escaping, and escaping liquid petroleum gas of this kind is inflammable and dangerous. This is an important consideration in addition to the fact that useful fuel is lost when the gas escapes.

Another consideration in the filling of tanks of this kind is the fact that filling through the filler hole becomes difficult where gas under pressure is attempting to escape and consequently some equalizing device must be provided to balance the gas pressure so that additional liquid petroleum can easily find its way into the tank. Heretofore certain types of vapor return valves have been utilized but as in so many new fields initially developed valves have included a large number of parts and have lacked some of the essentials of simple, efficient operation and inexpensiveness in cost.

With these requisites in mind it is an object of the invention to provide a new and improved fluid return valve which is compact and inexpensive in its assembly and relatively simple in structure from the point of view of the number of moving parts incorporated in the device.

Another object of the invention is to provide a new and improved fluid return valve which is

2 positive in its action under normal conditions when the valve is closed and sensitive in its operation when the valve is manipulated so as to serve as a fluid return.

Still another object of the invention is to provide a new and improved fluid return valve in which safety features have been emphasized to the extent that only the bearest minimum of gas is permitted to escape either during the process of an ordinary coupling operation for attaching a hose to the valve or in the event some leak in the hose line or connection might inadvertently occur.

Still further among the objects of the invention is to promote simplicity in the number of parts whereby certain parts serve a double function as exemplified by a single spring adapted to cause operation of two separate check valves and to so arrange the spring thus provided that the sensitivity of the spring may vary thereby to promote a more positive shut-off for the valve under fluid pressure under circumstances where the valve is intended to prevent an excess loss of fluid.

Also included among the objects is the provision of a valve structure including a spring device for operating separate valves wherein the response to a closing movement is improved in the event that there might be failure of the spring to serve its intended purpose.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
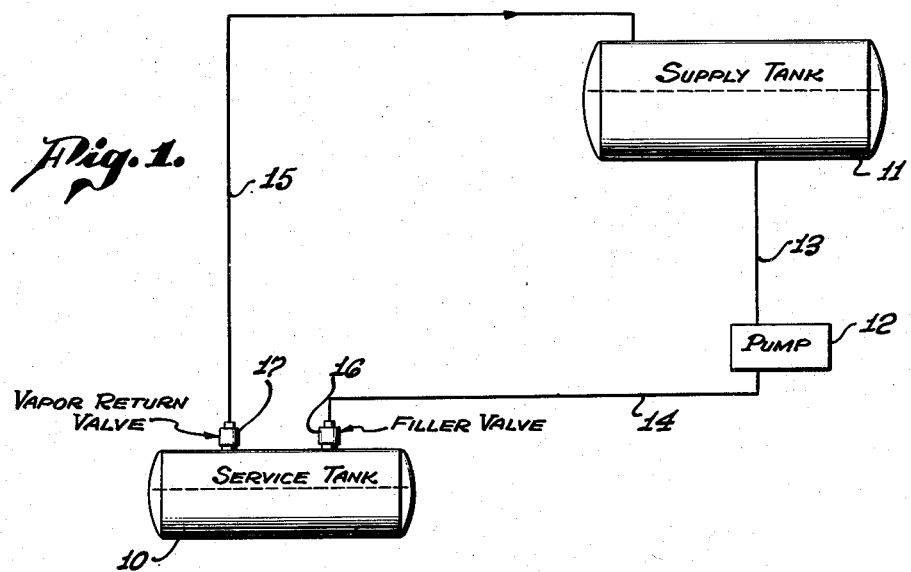
Figure 1 is a diagrammatic representation of a filling system for a liquid petroleum tank utilizing a filler valve and a vapor return valve.
Figure 3:
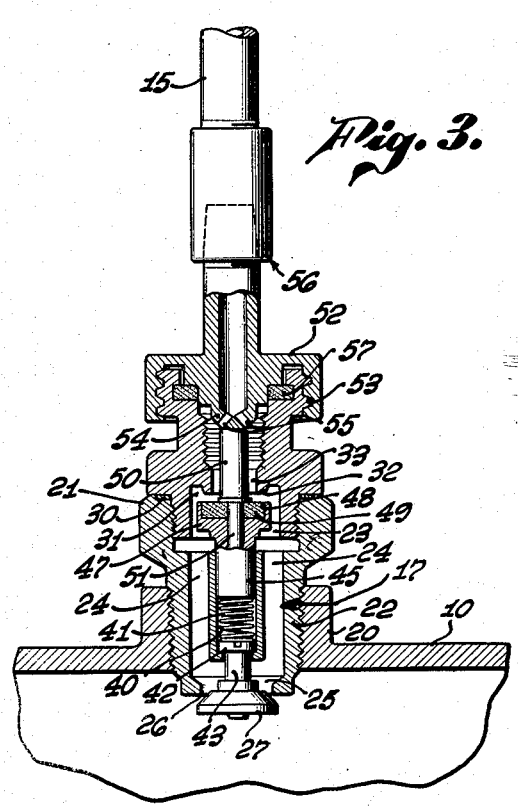
Figure 3 is a longitudinal sectional view of a vapor or fluid return valve showing the valve with a hose connection attached thereto in the position occupied during a filling operation.

To best understand the structural arrangement and utility of the novel valve structure comprising this invention, a brief description of a filling system for a liquid petroleum tank is material. As illustrated in Figure 1 a service tank represented by the reference character 10 comprises a storage reservoir for a liquid medium of the nature of liquid petroleum which is adapted to give off a combustible gas under substantial pressure. The liquid petroleum is designed to occupy the lower portion of the tank, the level of which will naturally change from time to time as the material is used during which time the upper portion of the tank is filled with a vapor of the same character under pressure. Piping from the service tank to an outlet system has been omitted as not comprising a portion of the inventive subject matter. The filling system, however, is included and is represented by a supply tank 11, a pump 12 associated with the supply tank, a supply line 13 from the supply tank to the pump, a supply line 14 from the pump to the service tank and a vapor return line 15 from the top of the service tank to the top of the supply tank.

A filler valve 16 on the top of the service tank provides a means for attachment for the line 14 while the service tank is being filled. A vapor return valve 17 provides a point of attachment for the line 15 to provide for return of vapor from the top of the service tank to the top of the supply tank.

By following the foregoing description it will be apparent that when the service tank is to be filled the line 14 is connected with the filler valve and also through the pump and the line 13 to the bottom of the supply tank. The line 15 is designed to balance the gas pressures between the top of the service tank and the top of the supply tank. Thus, for example, when the pump is started and liquid is pumped from the bottom of the supply tank into the service tank, the level of liquid as it rises causes the volume of the tank above the liquid level to shrink and consequently the gas present in the upper part of the service tank must escape and such escape is provided through the valve 17 and line 15 to the top of the supply tank, the volume of which progressively increases as the liquid level in the supply tank diminishes because of the liquid being pumped into the service tank.

In practice commercial type quick couplings are provided for connecting the lines to the valves of the service tank, the lines at the same time being usually permanently connected to some portion or other of the supply tank or the pump.

Figure 2:
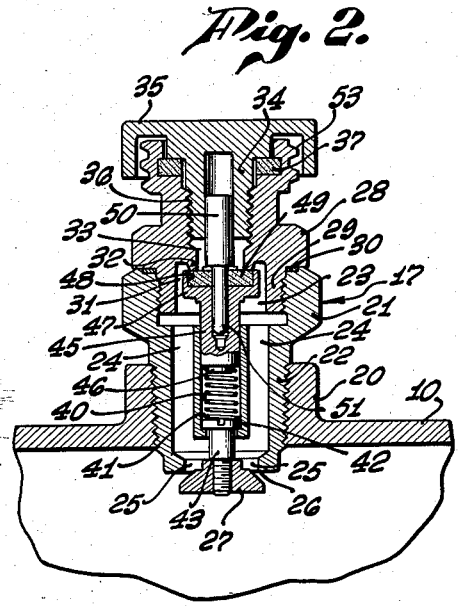
Figure 2 is a longitudinal sectional view of a vapor or fluid return valve adapted for use with the system in closed position.

In Figure 2 there is illustrated the vapor return valve 17 mounted upon a boss 20 on the upper wall of the service tank 10. As illustrated the vapor return valve comprises a body 21 having a threaded shank 22 threadedly engaging the boss 20. Inside the body there is provided a chamber 23 and passages 24 to connect the chamber with inlets 25 at the outer end of which is a valve seat 26. A valve element 27 is designed for cooperation with the seat 26.

In the embodiment shown there is provided a bonnet 28 having a threaded portion 29 adapted to threadedly engage the interior surface of the body 21. A seal 30 provides a leak-proof joint between the bonnet and the body. The bonnet is also provided with a pocket 31 which in effect forms part of the chamber 23. At the upper end of the pocket 31 is a raised valve seat 32 surrounding an outlet passage 33. As herein illustrated in normal position the outer end of the outlet 33 is closed by a plug 34 in a cap 35, the plug of the cap being threaded as at 36 for threaded engagement with a corresponding threaded portion of the bonnet. A seal or washer 37 provides for a tight joint.

In the interior valve device the body is provided with a bore 40 providing what may be considered as a guideway or retainer for a spring 41 and also for a head 42 of a stem 43 to which the valve element 27 is threadedly attached. Also guided within the bore 40 is a shank 45 having a spring keeper 46 at the bottom thereof adapted to the reception of the spring 41. The shank extends upwardly to form a somewhat disk-like upper end 47 on the top surface of which is a pocket or recess 48 including a washer 49 which in effect is a valve element adapted to seat upon the seat 32. A stem 50 extends in a centrally upward direction and is provided with a lower reduced portion 51 adapted to engage a similarly sized axial recess in the shank 45.

As illustrated in Figure 2 the valve is shown in normal closed position. Under such circumstances the valve element 49 is regularly pushed against its seat 32 by force of the spring 40. Under such circumstances this positive spring action coupled with a differential in pressure tends to firmly seal the washer 49 upon the seat thus insuring against possible leaks. The cap 35 is provided for increased safety and protection of the interior of the valve. The positions shown in Figure 2 are normal positions for the valve device.

When it is desired to connect the vapor return line 15 between the valve and the supply tank, there is provided a quick coupler 52 which is attached by a fitting 56 to the end of the line 15. It should be noted that the quick coupler is provided with large coarse threads 53 and also contains an interior bushing 54 having lower oblique apertures 55 communicating between the exterior and an interior bore 56 in the quick coupler. A washer 57 provides for a seal.

In operation the valve parts will normally assume the position shown in Figure 2. Under these circumstances the upper valve element exemplified by the washer 49 seats snugly against the seat 32. This seating is emphasized by action of the spring 41. Counteracting at the other end of the spring is the head 42 retained by a shoulder 43 from extending any further downwardly than is shown in Figure 2.

When the hose line 15 is to be attached to the vapor return valve it is necessary only to remove the cap 35 during which time the upper valve element will be tightly closed. Application of the fitting 52 to the upper end of the valve causes the interior bushing 54 to extend downwardly to a position encountering the stem 50 and thus the stem and the valve element 49 are forcibly pushed downwardly to open the valve passage through the outlet passage 33. The valve element 49 is therefore forcibly opened by mechanical means against the spring tension of the spring 41. Under these circumstances there will be a slight increase in tension on the spring 41 sufficient to hold the valve element 27 open. In this position of adjustment the valve element 27 will respond only to a pressure differential between the interior upper portion of the tank 10 and the pressure in the upper portion of the supply tank, that pressure differential being of substantial magnitude. In the absence of a substantial pressure differential there will be a free flow of returning vapor. It will also become clear that the gas pressure in the upper portion of the tank 10 cannot escape during the coupling operation because the valve element 49 is not depressed until the quick coupler 52 is screwed on. The last rotation of the broad threads shown in the drawings is sufficient to depress the valve element 49 at a distance sufficient to fully open the outlet passage. With the vapor return valve in this adjustment the service tank can be filled with liquid and the unwanted vapor pressure at the top of the tank can thus be materially reduced through the line 15 to the top of the supply tank.

If for any reason there should be a break in the line 15 there will be an increased pressure differential sufficient to seat the valve element 27 against the inlet passage valve seat 26, thus closing the valve against the escape of gas under pressure. The pressure differential of course will be greater than the differential between the pressure portions of the supply tank and service tank, respectively. The same automatic shut off of the valve element 27 will also occur if there should be a leak around the connection between the quick coupler 52 either at the initiation of the coupling operation or at the conclusion thereof.

If under any circumstances there should be a fracture of the spring 41, the resistance of the spring to closing motion of the valve element 27 is eliminated and the valve element will be closed by the pressure differential and thus shut off any possible vapor return or the escape of vapor into the atmosphere. Should the spring break when the valve is capped, the pressure differential would operate not only to close the valve element 27 but also to close the valve element 49, no longer held closed by spring pressure.

After the quick coupler has been entirely removed, thus relieving mechanical pressure against the stem 50 which heretofore in this description of operation has continued to be depressed, the spring 41 will be sufficient to force the valve element 49 against its seat 32. This operation reduces to some extent pressure on the spring 41 and once the quick coupler 52 is removed, a lesser spring tension will bear against the valve element 27 which will thereupon become more sensitive to pressure differentials and act as a quick shut off in case of accidental leak of gas through the vapor return valve. Consequently, at least one of the valve elements will close in the event of spring failure.

If, after the valve has been in service, it becomes necessary to inspect or replace either the valve element 49 or the spring 41, the bonnet 28 may be removed from the body 21, and thus permit the removal of the element 49 and the spring 41. During this operation the spring tension is completely removed from the valve element 27 and the pressure differential, with the spring removed, creates a positive closure of the valve element 27 on the seat 27.

From the foregoing description it will be apparent that the valve of the invention is of simplified construction. The single spring serves to impress both valve elements toward their initial position and the tension on the spring, varying as it does to a greater or lesser degree, improves the readiness of the valve elements to close under proper conditions or to remain open when it is the objective of the device to maintain the valve open for the return of vapor. The parts may be readily disassembled for the replacement of any parts of which there is substantially a minimum quantity. It therefore follows that the valve is not only simple in construction, easy to assemble and efficient in its operation but also that the valve is particularly safe during not only coupling and uncoupling operations but also in the event of a break in a hose line. Not least among the structural advantages is the reduction of the number of essential parts and of moving parts so as to greatly reduce the cost of the valve.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A fluid return valve including a safety shut-off feature comprising a valve body having a chamber therein, an inlet thereto and an outlet therefrom, a valve adapted to close the inlet having a normally closed position and another valve adapted to close the outlet having a normally open position, said valves being responsive to pressure differentials between inlet and outlet ends of the chamber, a common resilient means acting against said valves at all positions of adjustment and in opposite directions, the valve at the outlet being responsive to exterior mechanical operation.

2. A fluid return valve including a safety shut-off feature comprising a valve body having a chamber therein, valve seats respectively at inlet and outlet ends of said chamber facing in the same general direction, a valve element cooperable with each seat and responsive to pressure differentials between inlet and outlet ends of the chamber, a single spring acting against said valve elements at all positions of adjustment and in opposite directions and a stem on the valve element at the outlet end responsive to exterior mechanical operation.

3. A fluid return valve including a safety shut-off feature comprising a valve body having a chamber therein, valve seats respectively at inlet and outlet ends of said chamber facing in the same direction of flow, a valve element cooperable with each seat and responsive to pressure differentials between inlet and outlet ends of the chamber, a stop for one of said valve elements cooperable therewith upon movement in a direction contrary to a closing direction, a single compression spring bearing at one end against one valve element and at the other end against the other valve element and in opposite directions, said spring forming the sole operative connection between said valve elements in all positions thereof, and a stem on the other of said valve elements responsive to exterior mechanical operations.

4. A vapor return valve including an automatic shut-off feature comprising a valve body having a chamber therein, an inlet thereto for incoming fluid and a valve adapted to close the inlet, a bonnet having a sealed engagement with the body and having a pocket therein comprising a portion of the chamber, said pocket having an outlet from the chamber for incoming fluid leaving the chamber and a valve adapted to close the outlet, and a single continuous compression spring extending between said valves normally extending the valve at the inlet to closed position and the valve at the outlet to open position and having a variable effect on the last-identified valve depending on the position of the first-identified valve, the valve at said inlet being responsive to an exterior mechanical opening movement.

5. A vapor return valve including an automatic shut-off feature comprising a valve body having a chamber therein, a passage thereto and a valve seat in the passage, a bonnet having a sealed engagement with the body and having a pocket therein comprising a portion of the chamber, said pocket having another passage thereto and an inwardly facing valve seat in the last-identified passage, said body having an axially disposed bore, a single continuous compression spring therein, a shoulder in the body and a valve element adapted to fit the valve seat at the first-identified passage and normally engaging said shoulder, a valve element cooperable with the inwardly facing valve seat therewith, said spring having a position extending between said valve elements normally extending the valve at the inwardly facing valve seat to closed position and the valve at the first-identified passage to open position, the valve at the inwardly facing valve seat being responsive to an exterior mechanical opening movement.

6. A vapor return valve including an automatic shut-off feature comprising a valve body having a chamber therein, a first passage thereto and a valve seat in the first passage, a bonnet having a threaded sealed engagement with the body having a pocket therein comprising a portion of the chamber, said pocket having a passage therefrom and an inwardly facing valve seat in the last-identified passage, said body having an axially disposed bore and a single spring confined therein, a shoulder in the bore and a valve element normally engaging said shoulder and adapted to seat against the valve seat of the first-identified passage, a valve element cooperable with the inwardly facing valve seat, said spring having a position extending between said valve elements normally extending the valve element at the inwardly facing valve seat to closed position and the valve element at the first-identified passage to open position, the valve element at the inwardly facing valve seat having an axially disposed stem thereon extending through the bonnet and responsive to an exterior mechanical opening movement.

MARLOWE F. SELWYN.

REFERENCES CITED

The following references are of record in the file of this patent:

UNITED STATES PATENTS

| Number | Name | Date |
|---|---|---|
| 1,144,758 | Desmond | June 29, 1915 |
| 2,356,410 | Krugler | Aug. 24, 1944 |
| 2,361,865 | Norway | Oct. 31, 1944 |
| 2,463,493 | Norway | Mar. 1, 1949 |
| 2,516,424 | Roney | July 25, 1950 |